United States Patent
Simmons et al.

(10) Patent No.: US 9,110,550 B2
(45) Date of Patent: Aug. 18, 2015

(54) METHOD FOR RESTRUCTURING DISTORTED CAPACITIVE TOUCH DATA

(71) Applicants: Martin J. Simmons, Hampshire (GB); Predrag D. Vukovic, Hampshire (GB); Nicholas St. Hill, Reading (GB)

(72) Inventors: Martin J. Simmons, Hampshire (GB); Predrag D. Vukovic, Hampshire (GB); Nicholas St. Hill, Reading (GB)

(73) Assignee: Atmel Corporation, San Jose, CA (US)

(*) Notice: Subject to any disclaimer, the term of this patent is extended or adjusted under 35 U.S.C. 154(b) by 75 days.

(21) Appl. No.: 13/889,692

(22) Filed: May 8, 2013

(65) Prior Publication Data

US 2014/0333569 A1    Nov. 13, 2014

(51) Int. Cl.
*G06F 3/045*   (2006.01)
*G06F 3/044*   (2006.01)
*G06F 3/046*   (2006.01)

(52) U.S. Cl.
CPC .............. *G06F 3/044* (2013.01); *G06F 3/046* (2013.01)

(58) Field of Classification Search
CPC ....... G06F 3/041; G06F 3/0412; G06F 3/044; G06F 3/045
USPC .................................. 345/173–178
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2006/0026521 A1* | 2/2006 | Hotelling et al. | 715/702 |
| 2007/0285404 A1* | 12/2007 | Rimon et al. | 345/173 |
| 2009/0315854 A1 | 12/2009 | Matsuo | |
| 2010/0090967 A1* | 4/2010 | Jang | 345/173 |
| 2012/0098783 A1 | 4/2012 | Badaye et al. | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kent Chang
*Assistant Examiner* — Mark Edwards
(74) *Attorney, Agent, or Firm* — Baker Botts L.L.P.

(57) ABSTRACT

In one embodiment, a method for restructuring distorted capacitive touch data includes receiving an array of touch amplitude data associated with an electrode line of a capacitive touch sensor in response to a touch on a touch sensitive display. The method also includes detecting a distortion in the array of touch amplitude data and calculating, in response to detecting the distortion, a corrected array of touch amplitude data such that the corrected array of touch amplitude data represents the touch on the touch sensitive display.

20 Claims, 6 Drawing Sheets

METHOD FOR RESTRUCTURING DISTORTED CAPACITIVE TOUCH DATA

TECHNICAL FIELD

This disclosure generally relates to touch sensors, and more particularly to a method for restructuring distorted capacitive touch data.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine the position of the change in capacitance on the touch screen.

DESCRIPTION OF EXAMPLE EMBODIMENTS

In particular embodiments of a touch sensor, the touch sensor may be configured to detect single touches as well as multiple simultaneous touches on a touch screen. A user of the touch screen may perform a multiple touch, for example, by touching his thumb and forefinger to the screen simultaneously. The user's thumb will typically touch a much larger area on the touch screen than the user's forefinger. A touch such as that by the user's thumb, for example, is called a large touch.

Currently, large touches on a capacitive touch screen may appear to be broken up. The large touch causes retransmission in the electrode lines of the touch sensor resulting in distortion of the signals and the detection of a broken up touch. The distortion causes the touch controller to interpret the single large touch as multiple touches. The number of touches observed by the touch sensor is also dependent on the amplitude threshold where touch break up occurs. Setting a low amplitude threshold to compensate for the touch break up has the disadvantage of increased susceptibility to background noise which results in erroneous center of mass calculations. Another possible solution, simply merging two touches within a specified distance of one another, reduces the touch sensor's ability to resolve close touches.

Accordingly, aspects of the present disclosure include a method to restructure distorted large touches. The touch sensor estimates the gradient of the touch amplitudes and detects distorted touches by detecting large variations in the gradient. If a distorted touch is detected, the gradient estimate is used to restructure the touch so that the broken up touch appears as a single touch with correct center of mass coordinates.

The present disclosure allows the amplitude threshold to be set high enough to gain immunity from noise, yet remain sensitive enough to detect touches without suffering from retransmission distortion. Additionally, the present disclosure can be implemented as a separate module executed by the touch-sensor controller prior to position determination. The present disclosure operates on the measured capacitive touch data with no additional information required.

Figure 1:
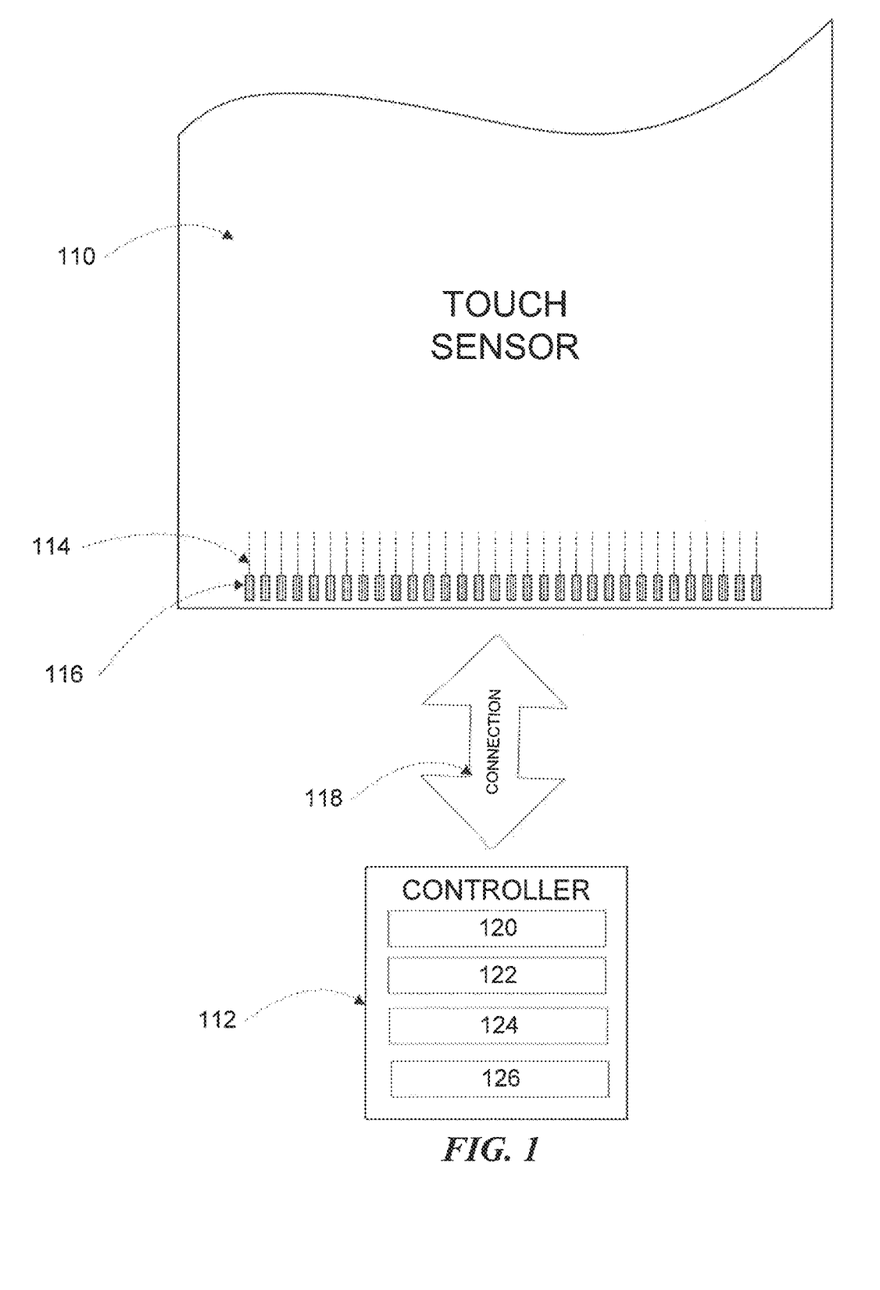
FIG. 1 illustrates an example touch sensor with an example touch-sensor controller, according to certain embodiments of the present disclosure.

FIG. 1 illustrates an example touch sensor 110 with an example touch-sensor controller 112, according to certain embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit 120, a drive unit 122, a sense unit 124, and a storage unit 126. Drive unit 122 may supply drive signals to the drive electrodes of touch sensor 110. Sense unit 124 may sense charge at the capacitive nodes of touch sensor 110 and provide measurement signals to processor unit 120 representing capacitances at the capacitive nodes. Processor unit 120 may control the supply of drive signals to the drive electrodes by drive unit 122 and process measurement signals from sense unit 124 to detect and process the presence and location of a touch or proximity input within the touch-sensitive area(s) of touch sensor 110. Processing measurement signals may include filtering, calculating gradients, and restructuring the measurement signals to more accurately represent the touch or proximity input. The processor unit may also track changes in the position of a touch or proximity input within the touch-sensitive area(s) of touch sensor 110. Storage unit 126 may store programming for execution by processor unit 120, including programming for controlling drive unit 122 to supply drive signals to the drive electrodes, programming for processing measurement signals from sense unit 124, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which drive unit 122 of touch-sensor controller 112 may supply drive signals to the drive electrodes. Other tracks 114 may provide sense connections for coupling touch-sensor controller 112 to sense electrodes of touch sensor 110, through which sense unit 124 of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Touch-sensor controller 112 may process the signals from touch sensor 110 to compensate for distortions in the raw input data. For example, touch-sensor controller 112 may recognize a distortion pattern associated with a large touch and manipulate the touch data to compensate for the distortion.

Figure 2:
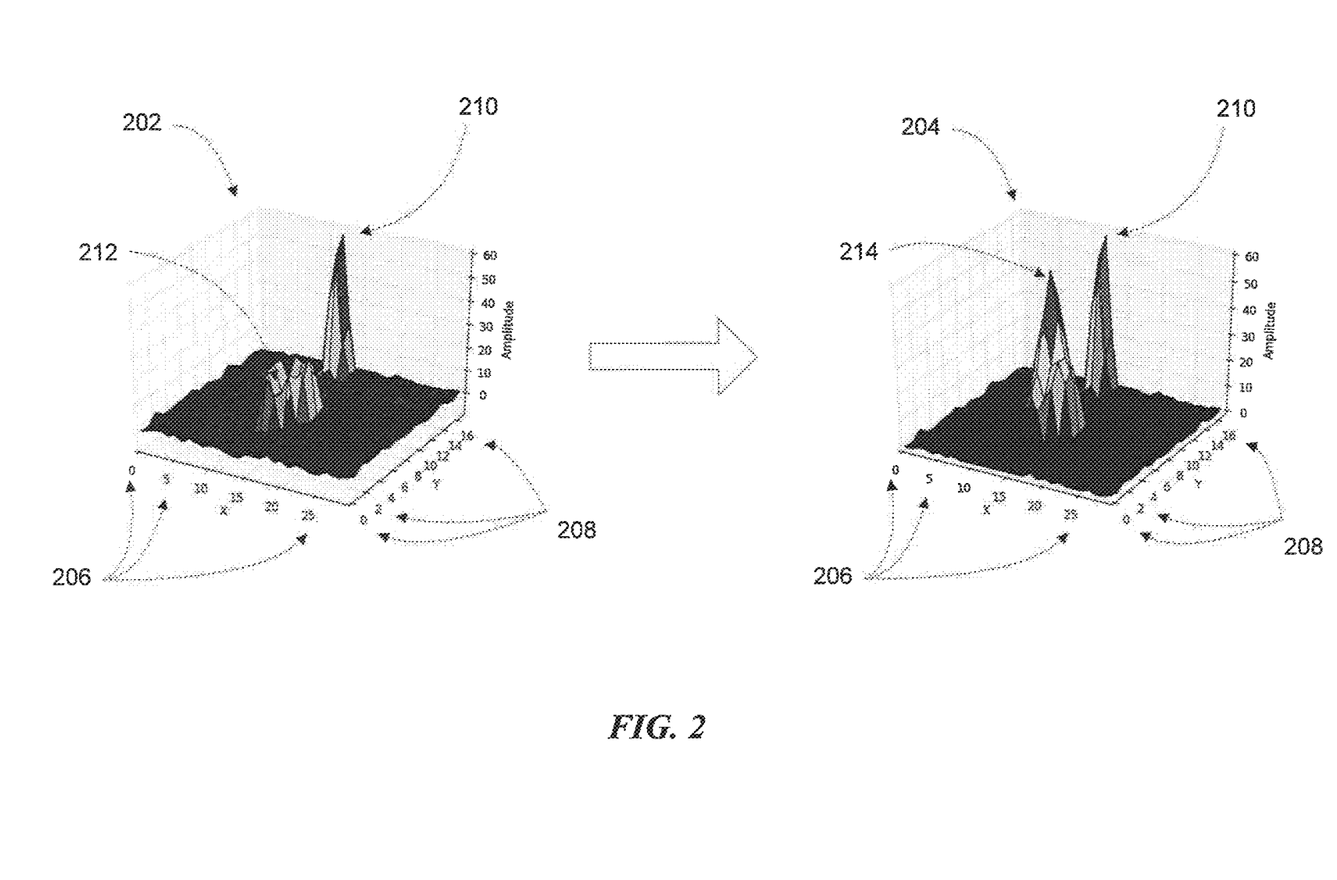
FIG. 2 illustrates an example of data representing a touch before and after correction, according to certain embodiments of the present disclosure.

FIG. 2 illustrates an example of data representing a touch before and after correction, according to certain embodiments of the present disclosure. Graph 202 represents touch amplitude data before correction and graph 204 represents corrected touch amplitude data for the same touch. X-coordinates 206 and Y-coordinates 208 represent electrode lines of a touch sensor such as touch sensor 110 of FIG. 1. While graphs 202 and 204 represent the electrode lines as a grid of X-coordinates 206 and Y-coordinates 208, the physical electrode lines may run in any suitable orientation or pattern.

A touch on the touch screen is represented by increased capacitance amplitude values. For example, graph 206 represents two simultaneous touches on the touch screen such as a thumb and forefinger. The amplitude values near 210 accurately represent the forefinger touch. The peak at 210 represents the center of mass of the forefinger touch. The amplitude values near 212 represent the thumb touch. Because of retransmission in the electrode lines of the touch sensor caused by the thumb touch, the amplitude values near 212 do not form a well defined peak. Instead of increasing in value from the edge of the touch to a peak near the touch's center of mass, the amplitude values begin to increase in value from the edge of the touch but then decrease near the touch's center of mass. The graph of the thumb touch is shaped more like a volcano instead of the well defined peak at 210. Without a well defined peak, the touch-sensor controller cannot accurately pinpoint the touch's center of mass. Additionally, the touch-sensor controller might interpret the smaller peaks near the edges of the thumb touch as two separate touches.

Graph 204 is a representation of the same touches from graph 202 with a restructured peak representing the large touch at 214. While the amplitude values near the touch at 210 are the same in graph 204 as graph 202, the amplitude values at peak 214 of graph 204 more accurately represent the thumb touch's center of mass than the amplitude values at 212 of graph 202. In one embodiment, a touch-sensor controller detects the distortion pattern near 212 of graph 202 and interpolates new amplitude data to create the well defined peak at 214 of graph 204. Although this disclosure refers to retransmission as an example phenomena that may cause a distorted touch, this disclosure contemplates a method for maintaining a single touch as a single structure independent of the cause of the breakup. A method for restructuring the distorted touch from the values near 212 to the values near 214 is described more fully below with respect to FIGS. 3A-3D.

Figure 3A:
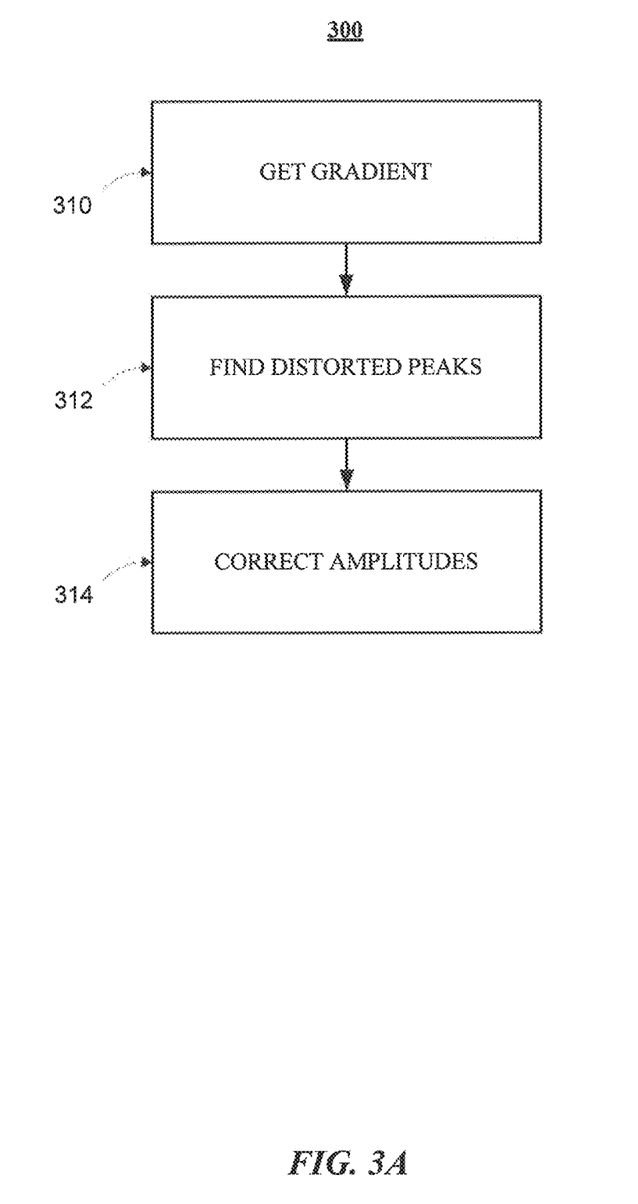
FIG. 3A illustrates a method for restructuring distorted capacitive touch data, according to certain embodiments of the present disclosure.
Figure 3B:
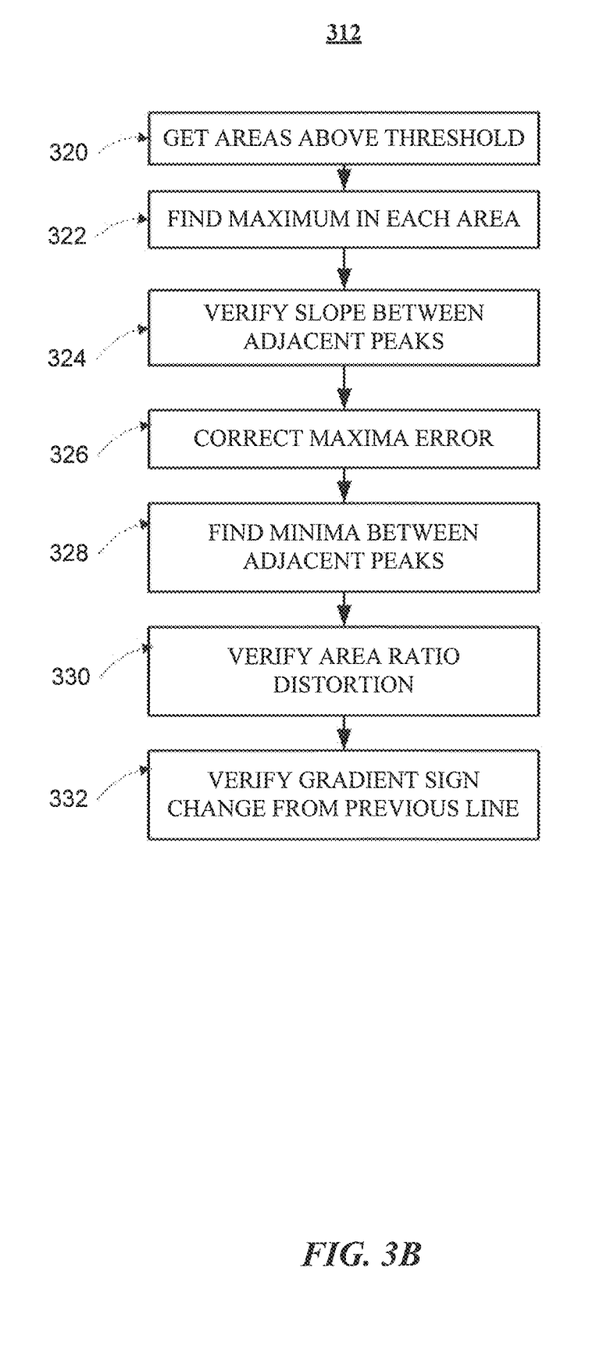
FIG. 3B illustrates an example method for the step of finding distorted peaks introduced in FIG. 3A.
Figure 3C:
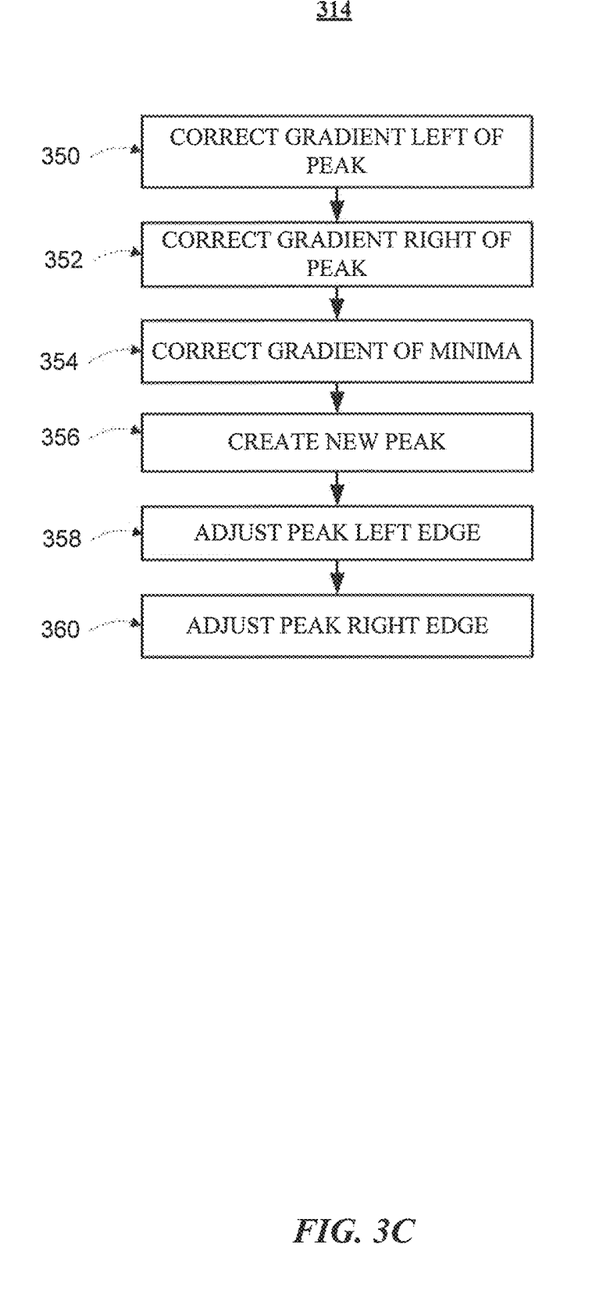
FIG. 3C illustrates an example method for the step of correcting amplitude values introduced in FIG. 3A.
Figure 3D:
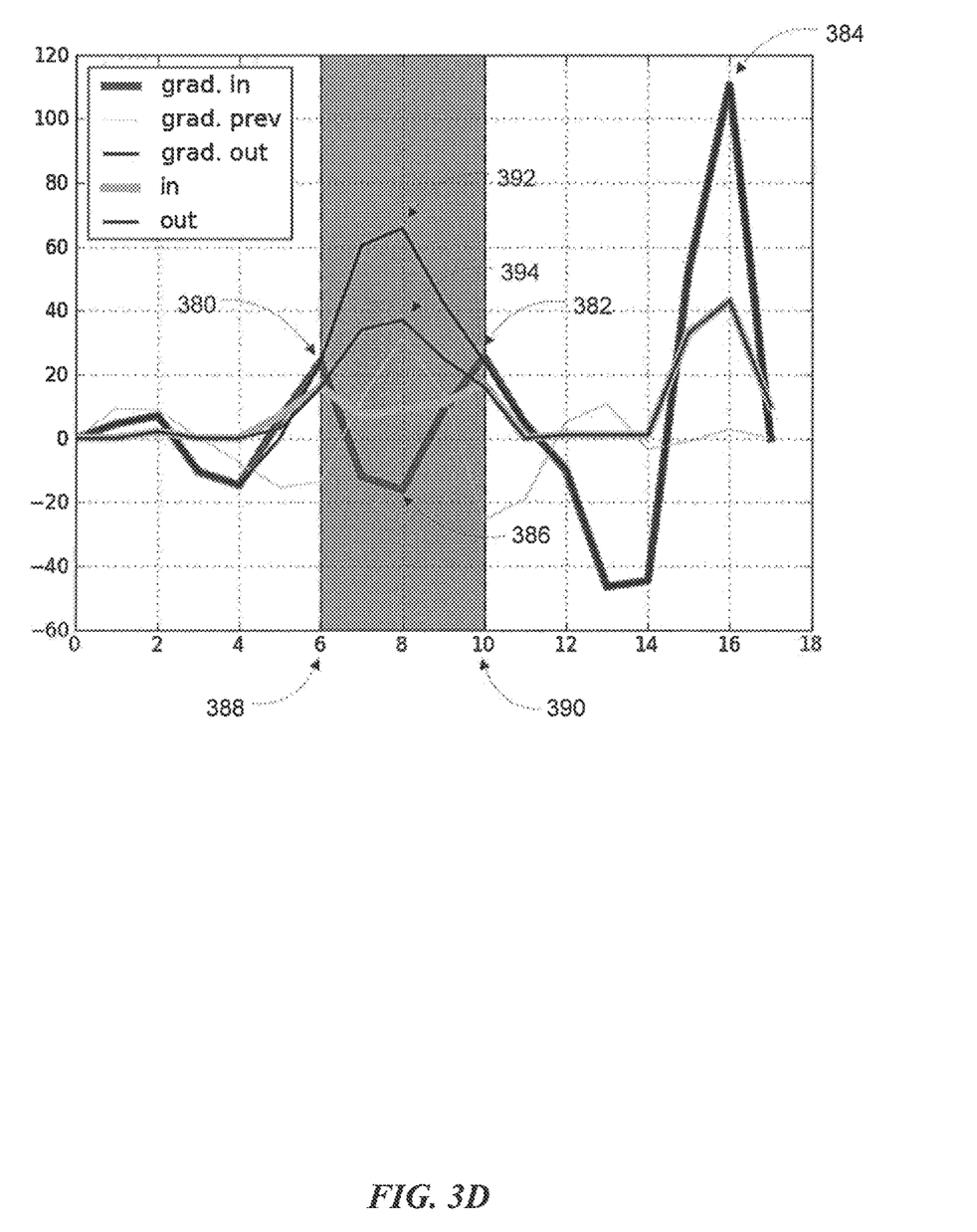
FIG. 3D is a graph of example input and output data of the methods illustrated in FIGS. 3A-3C processing an example touch such as the touch represented by FIG. 2.

FIGS. 3A-3D illustrate a method for restructuring distorted capacitive touch data, according to certain embodiments of the present disclosure. FIG. 3A illustrates an example method 300 for restructuring distorted capacitive touch data. FIGS. 3B and 3C are examples of particular steps of method 300. FIG. 3D is a graph of amplitude and gradient values along an electrode line of a touch sensor such as touch sensor 110 of FIG. 1. For example, FIG. 3D may represent a slice of graph 202 in FIG. 2 along X-coordinate 206 labeled 15 where the bottom axis of FIG. 3D represents Y-coordinates 208 at X-coordinate 15 and the side axis represents capacitance values. The description of the steps comprising method 300 will refer to FIG. 3D as necessary. In some embodiments, the steps of method 300 are carried out using one or more components of FIG. 1. For example, processor unit 120 of touch-sensor controller 112 may execute instructions that perform method 300. Furthermore, although this disclosure describes and illustrates particular components, devices, or systems carrying out particular steps in FIGS. 3A-3C, this disclosure contemplates any suitable combination of any suitable components, devices, or systems carrying out any suitable steps in FIGS. 3A-3C.

FIG. 3A illustrates example method 300 for restructuring distorted capacitive touch data along an electrode line of a touch sensor such as touch sensor 110 of FIG. 1. The capacitive touch data may be represented by an array of amplitude data along a particular X-coordinate 206 or Y-coordinate 208 in FIG. 2. Particular embodiments may repeat the steps of FIG. 3A. For example, method 300 may be repeated for electrode lines along the X-coordinate direction, electrode lines along the Y-coordinate direction, or electrode lines along both X and Y directions, in any suitable order. Furthermore, the steps of FIG. 3A may be performed at different times during the operation of touch sensor 10.

Method 300 begins at step 310 by obtaining a gradient estimate of the amplitude data. The gradient measures the rate of change in a given direction and may be estimated by applying a filter, such as a Finite Impulse Response (FIR) filter. In certain embodiments, step 310 estimates the gradient in a given direction by applying a FIR filter whose coefficients are [−1.0, 0.5, 1.0, 0.5, −1.0] in both the forward and reverse directions. Filtering in both directions ensures zero-phase shift and creates a filter which has a magnitude equal to the square of the original filter transfer function. The particular coefficients are chosen to simplify implementation of the method using integer arithmetic. In certain embodiments, the gradient estimate my be obtained with any suitable filter using any suitable coefficients or any suitable method for estimating a gradient. For example, in reference to FIG. 3D, the line labeled "in" represents the amplitude values detected by the touch sensor. The line labeled "grad. in" represents the gradient estimate of "in."

At step 312, the touch-sensor controller uses the gradient estimate to find any distorted peaks in the amplitude data. For example, in reference to FIG. 3D, 380 and 382 are distorted peaks in the estimated gradient. An example method for finding distorted peaks is illustrated in FIG. 3B and discussed in detail below.

At step 314, the touch-sensor controller corrects the amplitude values of any distorted peaks found at step 312 to accurately represent the large touch's center of mass. For example, in reference to FIG. 3D, the line labeled "out" represents the corrected amplitude data with corrected center of mass peak at 394. An exampled method for correcting distorted peaks is illustrated in FIG. 3C and discussed in detail below.

An example method 300 is shown in the following pseudo code for the procedure ProcessLine:

```
1: procedure PROCESSLINE(x, dx_prev)
2:    dx←GRADFILTER(x)           ▷ Returns the vector of gradient
                                    estimates
3:    ind←FINDPEAKS(x, dx)        ▷ Returns the peak positions
4:    (x, dx)←GRADCORRECT(x, dx,  ▷ Find and correct distortions
      ind, dx_prev)
5:    return (x, dx)
6: end procedure
```

An advantage of method 300 is that the touch-sensor controller may execute the method as a separate module prior to position determination. The touch-sensor controller need not modify existing modules to implement method 300. Another advantage is that method 300 operates on the measured capacitive touch data with no additional information required. The touch-sensor need not add or process additional sensors to correct the capacitive touch data to accurately represent a large touch.

FIG. 3B illustrates an example method 312 implementing step 312 of method 300 to find distorted peaks described above in reference to FIG. 3A. Beginning at step 320, the touch-sensor controller scans the amplitude and gradient arrays for values over a predetermined threshold value. The predetermined threshold value may be chosen to filter out noise. In this manner, method 312 avoids evaluating all peaks and instead focuses only on the areas above the threshold. The threshold value may vary depending on the particular components, devices, or systems carrying out particular steps of method 300. For example, in reference to FIG. 3D, a threshold value of 20 would filter any gradient or amplitude values below the dotted line crossing the vertical axis at 20. If no amplitude and gradient values over a predetermined threshold value are found, method 300 need not continue.

An example step 320 is shown in the following pseudo code for the procedure Threshold, where x is an amplitude array and dx is a corresponding gradient array:

```
1: procedure THRESHOLD(x, dx, threshold)
2.        b ← 0
3.        if dx ≥ threshold then
4.            if (2x) ≥ threshold then
5.                b ← 1              ▷ Threshold exceeded
6.            end if
7.        end if
8.        return b
9. end procedure
```

At step 322, the touch-sensor controller searches for maximums within the areas identified in thresholding step 320 above. For example, in reference to FIG. 3D, the touch-sensor controller would identify maximums at 380, 382, and 384.

At step 324, the touch-sensor controller verifies the slope between adjacent peaks identified at step 322 above. The maximum relative difference between detected peaks should not exceed a predetermined ratio. For ratios between peaks greater than a predetermined value, the peaks are assumed to be part of a continuous slope on the edge of a real peak. The predetermined ratio may vary depending on the particular components, devices, or systems carrying out particular steps of method 300. For example, in reference to FIG. 3D, the gradient values at 380 and 382 are nearly identical to each other, meaning the relative difference between them would be almost zero. If the relative difference between all adjacent peaks exceeds the predetermined ratio, method 300 need not continue.

An example step 324 is shown in the following pseudo code for the procedure ValidSlope λ where controls the relative difference (increasing λ increases the acceptable variation in peak height), $i_{left}$ is the left peak, and $i_{right}$ is the right peak:

```
1: procedure VALIDSLOPE(dx, i_left, i_right)
2.        rval ← True
3.        if (dx[i_left] > dx[i_right]) and (λdx[i_right] < dx[i_left]) then
4.            rval ← False
5.        else if (dx[i_left] < dx[i_right]) and (λdx[i_left] < dx[i_right]) then
6.            rval ← False
7.        end if
8.        return rval
9. end procedure
```

At step 326, the touch-sensor controller corrects for any error in the detected maxima caused by the discrete nature of the measurements. The real peak maxima may not always coincide exactly with the position determined using the gradient estimates. In the event of a distortion the actual peaks will be between the measured maxima and one position to the outside. For example, in the case of the left peak, the actual peak may be one position further left. In the case of the right peak, the actual peak may be one position further right.

An example step 326 is shown in the following pseudo code:

```
Ensure: i_left > 0
1: if (i_left > 0) and (x[i_left − 1] ≥ x[i_left]) then
2.        i_left ← i_left − 1
3. end if
Ensure: (i_right + 1) < len(x)
4. if (i_right + 1) < len(x) and (x[i_right + 1] ≥ x[i_right]) then
5.        i_right ← i_right + 1
6. end if
```

At step 328, the touch-sensor controller finds the minima ($i_{min}$) between the peaks. The minima is obtained by finding the position with the lowest gradient value between the peaks. For example, in reference to FIG. 3D, the minima between peaks 380 and 382 is at 386. In some embodiments, the touch-sensor controller may also verify that the difference between the minima and the peaks is within a predetermined range.

At step 330, the touch-sensor controller verifies that the two peaks, $i_{left}$ and $i_{right}$, represent a distortion caused by a large touch and not two individual touches. A touch on a touch screen results in a balanced condition such that the rate of charge dissipation in every direction away from the center of mass is substantially the same in every direction. Step 330 compares the ratio of the area between the left peak ($i_{left}$) and the minima ($i_{min}$) and the area between the right peak ($i_{right}$) and the minima ($i_{min}$). The further away from a steady state condition, the lower the probability that the two peaks are part of a single peak, rendering it unlikely to be a distorted large touch.

An example step 330 is shown in the following pseudo code where first the window is determined (e.g., see shaded window between 388 and 390 of FIG. 3D) and then the left and right area ratios are compared:

```
1: err_win_min ← 1
2. win ← min((i_min − i_left), (i_rght − i_min))
3. i_wl ← i_min − win
4. i_wr ← i_min + win
5. if i_left > (i_wl − err_win_min − 1) then
6.        i_wl ← i_left
7. end if
8. if i_rght < (i_wr + err_win_min + 1) then
9.        i_wr ← i_rght
10. end if
```

```
1: procedure ISAREARATIODISTORTED
2.        fm ← (dx[i_min])/4
3.        lsum ← sum(dx[i_wl : i_min − 1]) + fm       ▷ Sum left side
4.        rsum ← sum(dx[i_min + 1 : i_wr]) + fm       ▷ Sum right side
5.        if (lsum > 0) and (rsum > 0) then
6.            bPeakDistorted ← True
7.        else
8.            bPeakDistorted ← False
9.        end if
10.       return bPeakDistorted
11. end procedure
```

At step 332, the touch-sensor controller verifies that the two peaks, $i_{left}$ and $i_{right}$, represent a distortion caused by a large touch and not two individual touches by comparing the estimated gradient with the corrected gradient from an adjacent line of the touch sensor. For example, the touch-sensor controller may process X-coordinates 206 of graph 202 in FIG. 2 in order from 0 to 25, applying method 300 to each X-coordinate 206. Touch-sensor controller may save the corrected gradient from processing line 5 to use in a comparison when processing line 10. If the value of the gradient at both peaks and the minima changes sign between the current gradient values and the previous corrected values at those positions, then the two peaks likely represent a distorted large touch. For example, in reference to FIG. 3D, the line labeled "grad. prev" represents the corrected gradient from a previously processed electrode line, such as the line represented by X-coordinate 206 labeled 5 of graph 202 in FIG. 2. A comparison of the gradient values of "grad. in" at peaks 380 and 382 and minima 386 with the "grad. prev" values at the same coordinates shows a change of sign between each pair at each coordinate. The changes of sign indicate the window between 388 and 390 represents a distorted large touch.

An example step 332 is shown in the following pseudo code for the procedure IsGradientDistorted:

```
1: procedure ISGRADIENTDISTORTED 2.    bPeakDistorted ← True
3.    lsign ← sign(dx[i_left]) × sign(dx[i_left,prev])        ▷ Combine the signs on the left 4.    rsign ← sign(dx[i_rght]) × sign(dx[i_rght,prev])        ▷ Combine the signs on the right 5.    if (lsign > 0) or (rsign > 0) then
6.        if (2 × dx[i_min]) < threshold) then
7.            bPeakDistorted ← False                          ▷ Verified by checking the minima
8.        end if
9.    end if
10.   return bPeakDistorted
11. end procedure
```

Method 312 illustrates an example method of operating touch sensor 110 to find distorted peaks. Modifications, additions, or omissions may be made without departing from the scope of this disclosure. Steps may be combined, modified, or deleted where appropriate, and additional steps may be added. For example, thresholding step 320 or slope verification step 324 may be omitted where appropriate. One of skill in the art will recognize that performing both validation steps 330 and 332 is not always advantageous. For example, the validation at step 332 may be less efficient than the validation at step 330 because step 332 maintains the gradient from previous iterations, but step 332 is less susceptible to accidentally merging two legitimate peaks than step 330. For increased efficiency, one of skill in the art may include step 330 but omit step 332. For increased accuracy, one of skill in the art may include step 332.

FIG. 3C illustrates an example method 314 implementing step 314 of method 300 to correct the amplitude values of any distorted peaks found in method 312 described above in reference to FIG. 3B. In general, the correction is performed by reflecting the gradient around a line drawn through the left peak and the right peak to form a corrected gradient. A corrected amplitude array is estimated from the corrected gradient. For example, in reference to FIG. 3D, the line labeled "grad. out" represents the corrected gradient array. The corrected gradient follows "grad. in" except for the portion between peaks 380 and 382. Between 380 and 382, the corrected gradient is the reflection of "grad. in" around a line drawn through 380 and 382. The line labeled "out" represents the corrected amplitude measurements estimated from the corrected gradient.

Beginning at step 350, the touch-sensor controller corrects the gradient on the left side of the peak (e.g. between 380 and 386 in FIG. 3D). In certain embodiments, the touch-sensor controller may reflect the gradient around a line drawn through both the left and right peak. Touch-sensor controller may instead reflect the gradient around a line drawn horizontally through either peak. In some embodiments, touch-sensor controller may add or multiply the reflection by a constant or any suitable value. Touch-sensor controller may add or multiply the gradient values by a constant or any suitable value without reflecting. The particular correction method, variables, and constants may vary depending on the particular components, devices, or systems carrying out particular steps of method 300.

At step 352, the touch-sensor controller corrects the gradient on the right side of the peak (e.g. between 386 and 382 in FIG. 3D). The correction method is substantially the same as at step 350, but for the other side of the peak. For example, step 350 may correct the uphill edge, while step 352 corrects the downhill edge.

At step 354, the touch-sensor controller corrects the gradient for the minima, creating the corrected peak (e.g. 386 corrected to 392 in FIG. 3D). The method for correcting the minima may be the same correction method applied at steps 350 or 352.

After the corrected gradient is determined, touch-sensor controller calculates the corrected amplitude array at step 356. Touch-sensor controller may calculate the amplitude array by using the same filter, such as the FIR filter, as at step 310. In certain embodiments, the amplitude array may be obtained with any suitable filter using any suitable coefficients or any suitable method for converting the gradient back to an amplitude. For example, in reference to FIG. 3D, the line labeled "out" represents the corrected amplitude values calculated from the corrected gradient values "grad. out."

At step 358, touch-sensor controller may adjust the left edge of the corrected peak. Restructuring the peak redistributes energy by pulling the middle up. To compensate, the sides of the peak are pulled in. In certain embodiments, touch-sensor controller uses the corrected gradient to move the left edge one position towards the middle.

At step 358, touch-sensor controller may adjust the right edge of the corrected peak. In certain embodiments, touch-sensor controller uses the corrected gradient to move the right edge one position towards the middle.

An example method 314 is shown in the following pseudo code for the procedure ReshapePeak:

```
1: procedure RESHAPEPEAK(x,dx, i_left, i_rght, i_min)
2.   for i = (i_left + 1) → (i_min − 1) do              ▷ Peak left side
3.       tmp ← (2 × dx[i]) − dx[i_left]
4.       dx[i] ← max(dx[i],tmp)
5.   end for
6.   for i = (i_min + 1) → (i_rght − 1) do              ▷ Peak right side
7.       tmp ← (2 × dx[i]) − dx[i_rght]
8.       dx[i] ← max(dx[i],tmp)
9.   end for
10.  tmp ← dx[i_left] + dx[i_rght] − dx[i_min]          ▷ Correct the minima position
11.  dx[i_min] ← max(dx[i_min],tmp)
12.  for i = (i_left + 1) → (i_rght − 1) do             ▷ Create new peak
13.      x[i] ← x[i_left] + round(f × (dx[i] − dx[i_left]))
14.  end for
Ensure: i_left > 0
15.  if i_left > 0 then                                 ▷ Adjust peak left edge
16.      tmp = dx[i_left] − mean(dx[i_left − 1 : i_left + 1])
17.      if tmp < 0 then
18.          x[i_left − 1] ← floor(x[i_left − 1] + (f × tmp))
19.          dx[i_left − 1] ← dx[i_left − 1] + tmp
20.      else
21.          x[i_left] ← floor(x[i_left] − (f × tmp))
22.          dx[i_left] ← dx[i_left] − tmp
23.      end if
24.  end if
Ensure: Maximum line index not exceeded
25.  if i_rght < length(x) then                         ▷ Adjust peak right edge
26.      tmp = dx[i_rght] − mean(dx[i_rght − 1 : i_rght + 1])
27.      if tmp < 0 then
28.          x[i_rght + 1] ← floor(x[i_rght + 1] + (f × tmp))
29.          dx[i_rght + 1] ← dx[i_rght + 1] + tmp
30.      else
31.          x[i_rght] ← floor(x[i_rght] − (f × tmp))
32.          dx[i_rght] ← dx[i_rght] − tmp
33.      end if
34.  end if
35.  return (x,dx)
36. end procedure
```

Method 314 illustrates an example method of operating touch sensor 110 to correct distorted peaks. Modifications, additions, or omissions may be made without departing from the scope of this disclosure. Steps may be combined, modified, or deleted where appropriate, and additional steps may be added. For example, the order of steps 350 and 352, and steps 358 and 360 may be reversed to perform operations on the right side or edge before the left side or edge. Or steps may be combined to process the left, right, maxima, or minima in one step, where appropriate.

Certain embodiments of the invention may provide one or more technical advantages. In some embodiments, the touch shape of a large touch is restored to accurately represent the center of mass of the large touch; a single large touch is no longer reported as multiple touches. A touch sensor may set the amplitude threshold high enough to gain immunity from noise, yet still remain sensitive enough to detect touches without suffering from distortion. In certain embodiments, the touch sensor's ability to resolve close touches is preserved. Certain embodiments may implement the methods disclosed herein as a stand-alone module without requiring additional information or input.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for restructuring distorted capacitive touch data comprising performing the following actions by at least one computer:
   receiving an array of touch amplitude data associated with an electrode line of a capacitive touch sensor in response to a touch on a touch sensitive display, the touch amplitude data comprising capacitance measurements associated with coordinates along the electrode line;
   calculating a gradient array that is representative of the gradient of the touch amplitude data;
   identifying a first gradient maximum and a second gradient maximum in the gradient array;
   determining whether the gradient array between the first gradient maximum and the second gradient maximum represents a distorted touch; and
   upon determining the gradient array between the first gradient maximum and the second gradient maximum represents a distorted touch, calculating a corrected array of touch amplitude data such that the corrected array of touch amplitude data represents the touch on the touch sensitive display, the calculating the corrected array of touch amplitude data comprising:
reflecting the gradients in the gradient array between the first gradient maximum and the second gradient maximum over a line between the first gradient maximum and the second gradient maximum; and
estimating the corrected array of touch amplitude data from the reflected gradients.

2. The method of claim 1 wherein determining whether the gradient array between the first gradient maximum and the second gradient maximum represents a distorted touch comprises:
determining a change in direction exists between the first gradient maximum and a first adjacent gradient, where the first adjacent gradient is a gradient of touch amplitude data from an adjacent electrode line of the capacitive touch sensor; and
determining a change in direction exists between the second gradient maximum and a second adjacent gradient, where the second adjacent gradient is a gradient of touch amplitude data from the adjacent electrode line of the capacitive touch sensor.

3. The method of claim 1 wherein determining whether the gradient array between the first gradient maximum and the second gradient maximum represents a distorted touch comprises:
identifying a gradient minimum between the first gradient maximum and the second gradient maximum in the gradient array; and
determining gradients between the first gradient maximum and the gradient minimum are substantially equal to gradients between the gradient minimum and the second gradient maximum.

4. The method of claim 1 further comprising ignoring gradient values below a predefined threshold when identifying the first gradient maximum and the second gradient maximum in the gradient array.

5. The method of claim 1 wherein the calculating the corrected array of touch amplitude data further comprises smoothing gradient values near the first gradient maximum and the second gradient maximum.

6. The method of claim 1 wherein calculating a gradient array that is representative of the gradient of the touch amplitude data comprises applying a finite impulse response filter to the touch amplitude data.

7. The method of claim 6 wherein the finite impulse response filter coefficients are −1.0, 0.5, 1.0, 0.5, and −1.0.

8. One or more computer-readable non-transitory storage media embodying logic that is operable when executed to:
receive an array of touch amplitude data associated with an electrode line of a capacitive touch sensor in response to a touch on a touch sensitive display, the touch amplitude data comprising capacitance measurements associated with coordinates along the electrode line;
calculate a gradient array that is representative of the gradient of the touch amplitude data;
identify a first gradient maximum and a second gradient maximum in the gradient array;
determine whether the gradient array between the first gradient maximum and the second gradient maximum represents a distorted touch; and
upon determining the gradient array between the first gradient maximum and the second gradient maximum represents a distorted touch, calculate a corrected array of touch amplitude data such that the corrected array of touch amplitude data represents the touch on the touch sensitive display, the calculating the corrected array of touch amplitude data comprising:
reflecting the gradients in the gradient array between the first gradient maximum and the second gradient maximum over a line between the first gradient maximum and the second gradient maximum; and
estimating the corrected array of touch amplitude data from the reflected gradients.

9. The media of claim 8, wherein determining whether the gradient array between the first gradient maximum and the second gradient maximum represents a distorted touch comprises:
determining a change in direction exists between the first gradient maximum and a first adjacent gradient, where the first adjacent gradient is a gradient of touch amplitude data from an adjacent electrode line of the capacitive touch sensor; and
determining a change in direction exists between the second gradient maximum and a second adjacent gradient, where the second adjacent gradient is a gradient of touch amplitude data from the adjacent electrode line of the capacitive touch sensor.

10. The media of claim 8, wherein determining whether the gradient array between the first gradient maximum and the second gradient maximum represents a distorted touch comprises:
identifying a gradient minimum between the first gradient maximum and the second gradient maximum in the gradient array; and
determining gradients between the first gradient maximum and the gradient minimum are substantially equal to gradients between the gradient minimum and the second gradient maximum.

11. The media of claim 8, wherein the logic is further operable when executed to ignore gradient values below a predefined threshold when identifying the first gradient maximum and the second gradient maximum in the gradient array.

12. The media of claim 8, wherein the calculating the corrected array of touch amplitude data further comprises smoothing gradient values near the first gradient maximum and the second gradient maximum.

13. The media of claim 8, wherein calculating a gradient array that is representative of the gradient of the touch amplitude data comprises applying a finite impulse response filter to the touch amplitude data.

14. The media of claim 13, wherein the finite impulse response filter coefficients are −1.0, 0.5, 1.0, 0.5, and −1.0.

15. A device comprising:
a touch sensor; and
a touch-sensor controller operable to:
receive an array of touch amplitude data associated with an electrode line of a capacitive touch sensor in response to a touch on a touch sensitive display, the touch amplitude data comprising capacitance measurements associated with coordinates along the electrode line;
calculate a gradient array that is representative of the gradient of the touch amplitude data;
identify a first gradient maximum and a second gradient maximum in the gradient array;
determine whether the gradient array between the first gradient maximum and the second gradient maximum represents a distorted touch; and
upon determining the gradient array between the first gradient maximum and the second gradient maximum represents a distorted touch, calculate a corrected array of touch amplitude data such that the corrected array of touch amplitude data represents the touch on the touch sensitive display, the calculating the corrected array of touch amplitude data comprising:

reflecting the gradients in the gradient array between the first gradient maximum and the second gradient maximum over the line between the first gradient maximum and the second gradient maximum; and estimating the corrected array of touch amplitude data from the reflected gradients.

16. The device of claim 15, wherein determining whether the gradient array between the first gradient maximum and the second gradient maximum represents a distorted touch comprises:

determining a change in direction exists between the first gradient maximum and a first adjacent gradient, where the first adjacent gradient is a gradient of touch amplitude data from an adjacent electrode line of the capacitive touch sensor; and determining a change in direction exists between the second gradient maximum and a second adjacent gradient, where the second adjacent gradient is a gradient of touch amplitude data from the adjacent electrode line of the capacitive touch sensor.

17. The device of claim 15, wherein determining whether the gradient array between the first gradient maximum and the second gradient maximum represents a distorted touch comprises:

identifying a gradient minimum between the first gradient maximum and the second gradient maximum in the gradient array; and determining gradients between the first gradient maximum and the gradient minimum are substantially equal to gradients between the gradient minimum and the second gradient maximum.

18. The device of claim 15, wherein the touch-sensor controller is further operable to ignore gradient values below a predefined threshold when identifying the first gradient maximum and the second gradient maximum in the gradient array.

19. The device of claim 15, wherein calculating a gradient array that is representative of the gradient of the touch amplitude data comprises applying a finite impulse response filter to the touch amplitude data.

20. The device of claim 15, wherein the finite impulse response filter coefficients are −1.0, 0.5, 1.0, 0.5, and −1.0.

* * * * *